United States Patent
Russell et al.

(10) Patent No.: US 6,641,205 B1
(45) Date of Patent: Nov. 4, 2003

(54) VEHICLE DOOR SEALING ASSEMBLY

(75) Inventors: Stephen Russell, Raymond, OH (US);
John Collins, Raymond, OH (US);
Kazuo Onodera, Raymond, OH (US);
Tony Kmeid, Raymond, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/278,681

(22) Filed: Oct. 23, 2002

(51) Int. Cl.[7] .................................................. B60J 5/04
(52) U.S. Cl. ..................................... 296/146.9; 49/479.1
(58) Field of Search ...................... 296/146.9; 49/475.1, 49/479.1

(56) References Cited

U.S. PATENT DOCUMENTS

| | | |
|---|---|---|
| 4,901,476 A | 2/1990 | Nagashima et al. |
| 5,207,029 A | 5/1993 | Nozaki et al. |
| 5,250,248 A | 10/1993 | Arima |
| 5,269,101 A | 12/1993 | Nozaki et al. |
| 5,347,758 A | 9/1994 | Yamane |
| 5,369,914 A | 12/1994 | Takeuchi |
| 5,389,409 A | 2/1995 | Iwasa et al. |
| 5,446,998 A | 9/1995 | Arima |
| 6,138,415 A | 10/2000 | Ohtsu et al. |
| 6,332,641 B1 * | 12/2001 | Okana ...................... 296/146.6 |
| 6,393,766 B2 | 5/2002 | Nozaki et al. |

\* cited by examiner

Primary Examiner—Joseph D. Pape
(74) Attorney, Agent, or Firm—Rankin, Hill, Porter & Clark LLP; Mark E. Duell

(57) ABSTRACT

An assembly for sealing a front door and a rear door in a door opening on a vehicle lacking a conventional, separate B-pillar. The front door carries an adaptor at a lower rear end thereof that defines a generally sharp corner over which a portion of the front door seal extends. The rear door defines a sealing surface that is engaged by the portion of the front door seal extending over the adaptor. The rear door includes a rear door seal, a portion of which extends over an outer surface of the rear door and is engaged a sealing surface provided by the front door. At least a portion of the rear door seal and sealing surface are integrally formed by a sealing boot disposed over a lower end of the rear door so as to create a seal-to-seal type engagement between the front and rear doors.

30 Claims, 4 Drawing Sheets

VEHICLE DOOR SEALING ASSEMBLY

BACKGROUND OF THE INVENTION

Four-door vehicles conventionally include an A-pillar forward of the front door, and a B-pillar between the front door and the rear door. The A-pillar, roof, B-pillar, rocker panel, and a front body panel thus define the front door opening. Similarly, the B-pillar, roof, rocker panel, and a rear body panel define the rear door opening. Each of the doors includes an inner surface that includes a raised inner portion and a relatively recessed peripheral portion.

A pair of peripheral seals is provided for each of the front and rear doors. Essentially, a first seal is secured to the vehicle body so as to surround the door opening and seats against a raised inner portion of the door. The second seal is disposed around the periphery of the door (i.e., outwardly adjacent the recessed portion), and seats against a sealing surface surrounding the door opening. Accordingly, the first seal is a relatively inner seal and the second seal is a relatively outer seal.

With such conventional vehicles, the B-pillar cooperates with the front and rear doors to seal the lower rear corner of the front door and the lower front corner of the rear door, respectively. More specifically, the bottom end of the B-pillar includes a pair of oppositely directed curved surfaces that smoothly merge with the front and rear rocker panels, respectively. An outer sealing surface is provided on a first or outer side of the B-pillar curved surface against which a portion of the second seal engages. Similarly, the B-pillar surface has a portion of the first seal secured thereto against which the raised inner portion of the door seals. Accordingly, in conventional four-door vehicles, the B-pillar is essential in sealing the front and rear doors to the vehicle body.

Unfortunately, in four-door vehicles lacking a conventional, separate B-pillar, such as vehicles having a front door and a rear door that open in opposite directions and overlap at rearward and forward edges thereof, respectively, the foregoing conventional sealing arrangement is not possible. Therefore, there exists a need in the art for a method and device for sealing such front and rear doors to one another and the host vehicle body. There further exists a need in the art for an adapter to permit a front door that is ordinarily used on a vehicle including a conventional B-pillar to be used on a vehicle lacking a conventional B-pillar.

SUMMARY OF THE INVENTION

The present invention is directed toward an improved sealing system that is specially adapted for use on a vehicle lacking a conventional, separate B-pillar and in which the front and rear doors open in opposite directions and at least partially overlap along their adjacent edges. The present invention is further directed toward an adaptor that is a part of the improved sealing system and serves to extend the seal carried on the front door to a position in which it may sealingly engage the rear door.

In accordance with the present invention, a front door has a hinged forward end and a free rearward end. A first or door opening seal is secured to a vehicle body around the door opening while a second or front door seal is secured to an inner periphery of the front door. The front door defines a first sealing surface that extends around the front door and generally surrounds associated portions of the second or door opening seal when the front door is closed.

The vehicle body defines a second sealing surface that surrounds the door opening. When the front door is closed, the door opening seal is seated on the first sealing surface provided by the front door and the front door seal is seated on the second sealing surface provided by the vehicle body.

In further accordance with the present invention, a gusset or corner piece, which serves as an adaptor, is secured to a lower rear corner of the front door. The gusset has a portion of the front door seal secured thereto and serves to extend the seal toward a lower rear corner of the front door so that the front door seal is positioned to sealingly engage the rear door.

In further accordance with the present invention, a rear door includes a hinged rearward end and a free forward end. The rear door defines a third sealing surface that cooperates with the second sealing surface to provide a generally continuous surface inwardly adjacent the front door and against which the front door seal seats when the front and rear doors are closed. A lower front corner of the rear door has a boot secured thereto, the boot being integral with a third or rear door seal and defining a sealing surface, which is a portion of the third sealing surface, against which the portion of the front door seal carried by the gusset seats so as to seal the lower portions of the front and rear doors to one another.

The third or rear door seal is separated into a first part and a second part. The first part of the rear door seal is disposed adjacent the periphery of the forward end of the rear door, and more specifically on the outward facing side of the forward end of the rear door, and seats on the first sealing surface of the front door. When the front and rear doors are closed, the first part of the rear door seal is disposed rearwardly and outwardly relative to the portion of the front door seal that extends along the rearward end of the front door. Accordingly, the rearward end of the front door overlaps the forward end of the rear door when the front and rear doors are closed. The second part of the rear door seal extends along the upper, rearward, and lower peripheral ends of the rear door and seats against the second sealing surface provided by the vehicle body.

The rear door also provides a fourth or inwardly facing rear door sealing surface that seats against the door opening seal provided around the door opening when the rear door is closed. Like the front door seal, the second part of the rear door seal is disposed outwardly relative to the door opening seal when the rear door is closed against the vehicle body and essentially surrounds the associated portions of the door opening seal.

In further accordance with the present invention, the gusset or corner piece extends the outer front door seal downwardly and outwardly toward the tip of the lower rear corner of the front door, and permits sealing engagement between the boot and the front door seal. Accordingly, at least a portion of the second sealing surface is provided by the resilient boot of the rear door, and defines a seal-on-seal type engagement.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
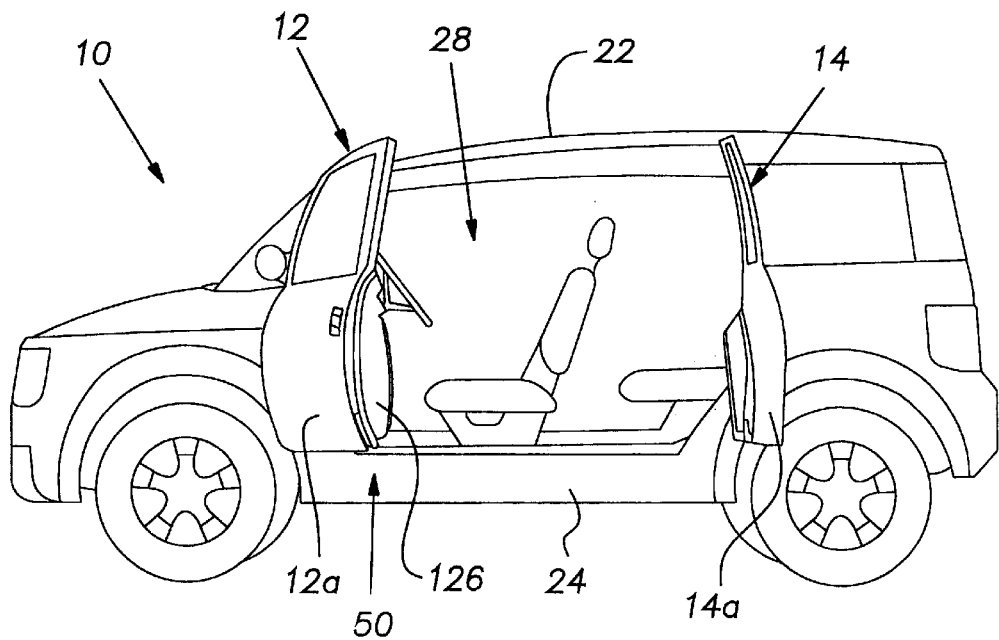
FIG. 1 schematically illustrates a vehicle incorporating the sealing device of the present invention, with the front and rear doors in an open position.
Figure 2:
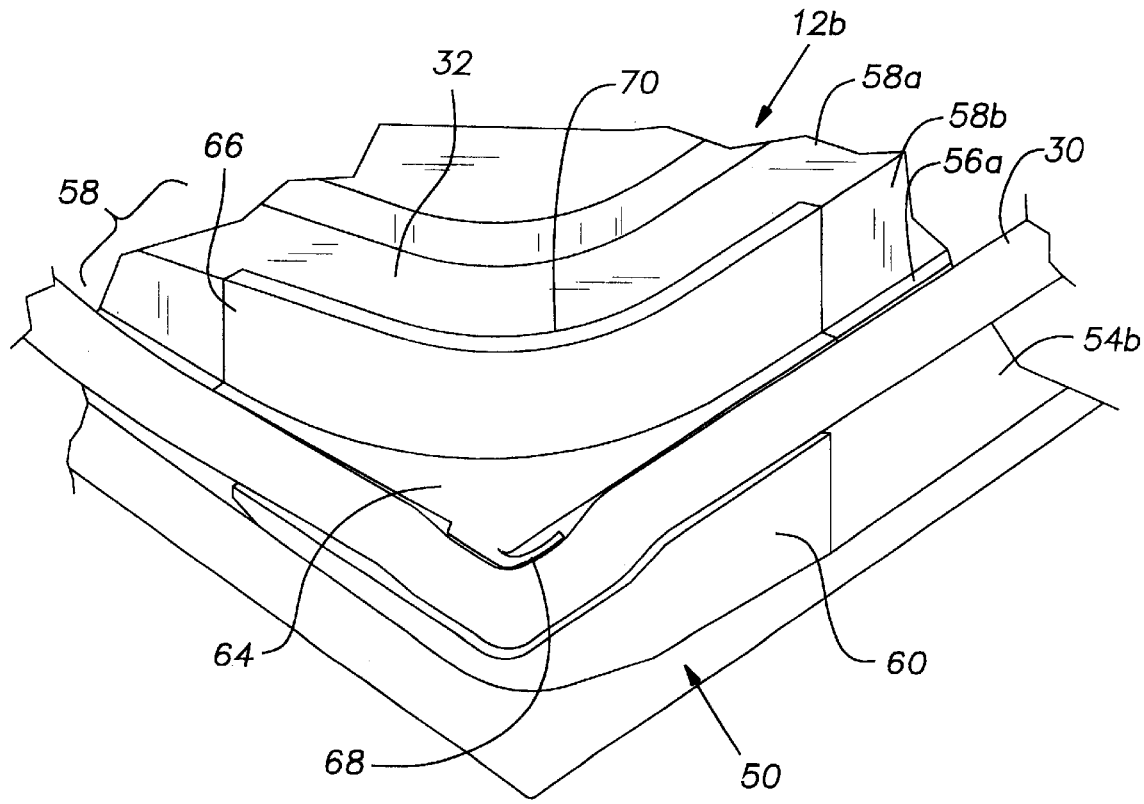
FIG. 2 is an enlarged perspective view of a lower rear corner of the front door.
Figure 3:
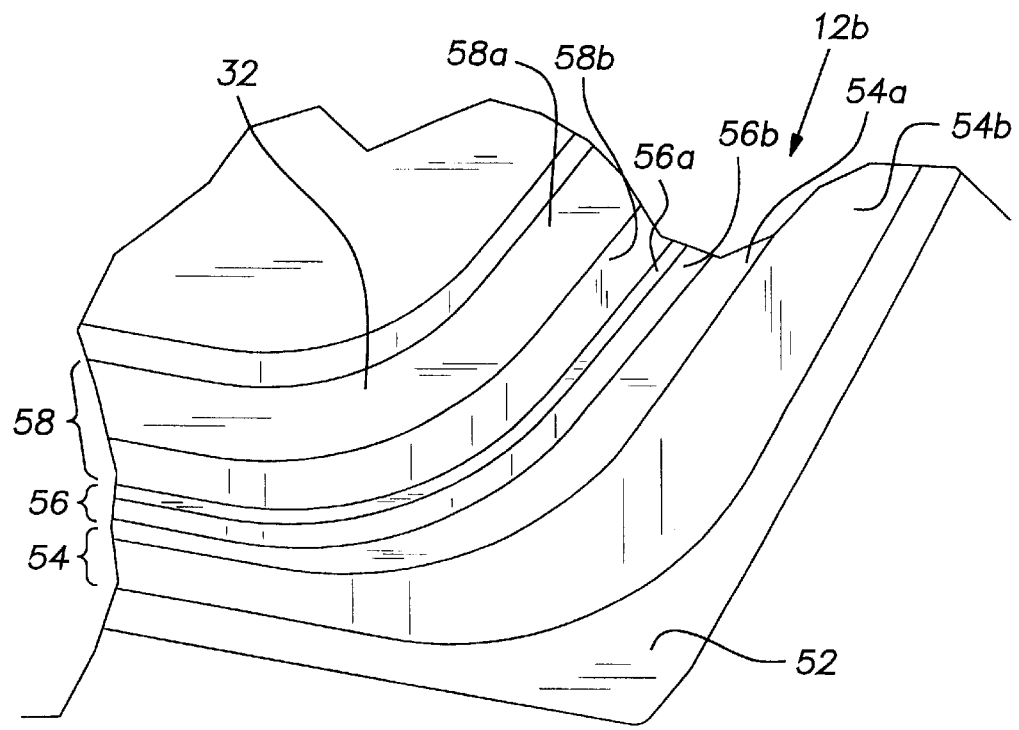
FIG. 3 is an exploded perspective view of the front door lower rear corner shown in FIG. 2.
Figure 3:
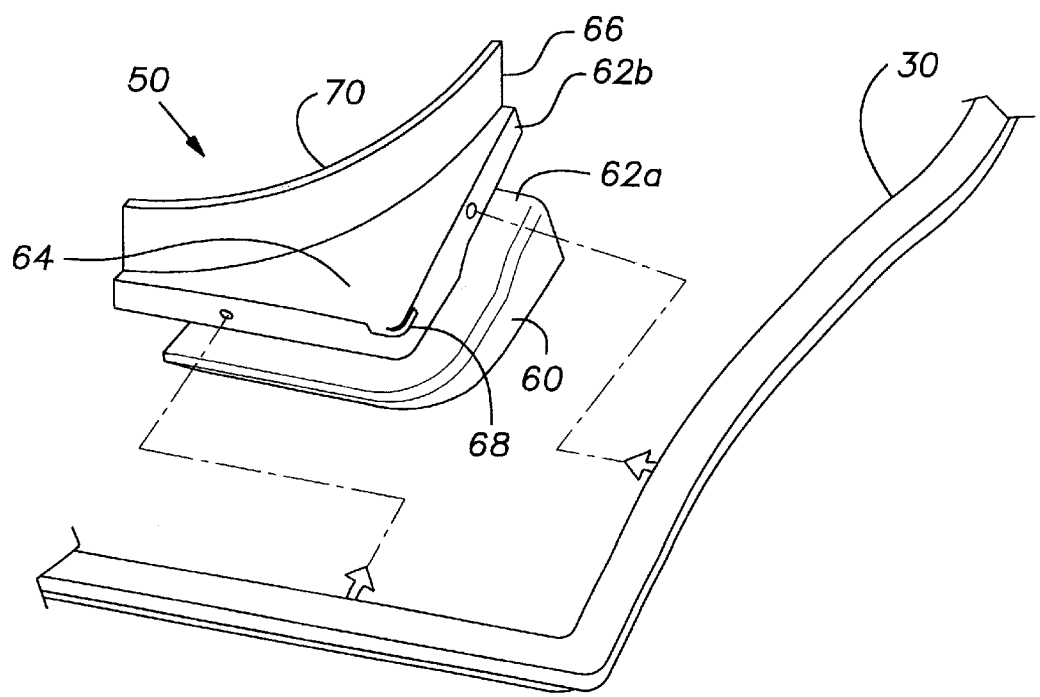
Figure 4:
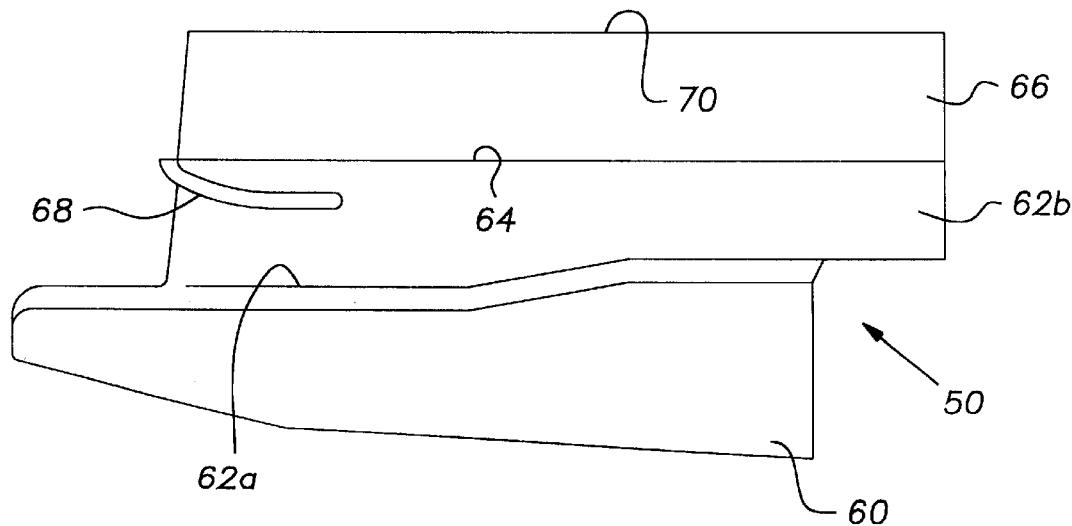
FIG. 4 is a side elevational view of the gusset, with the seal removed.
Figure 6:
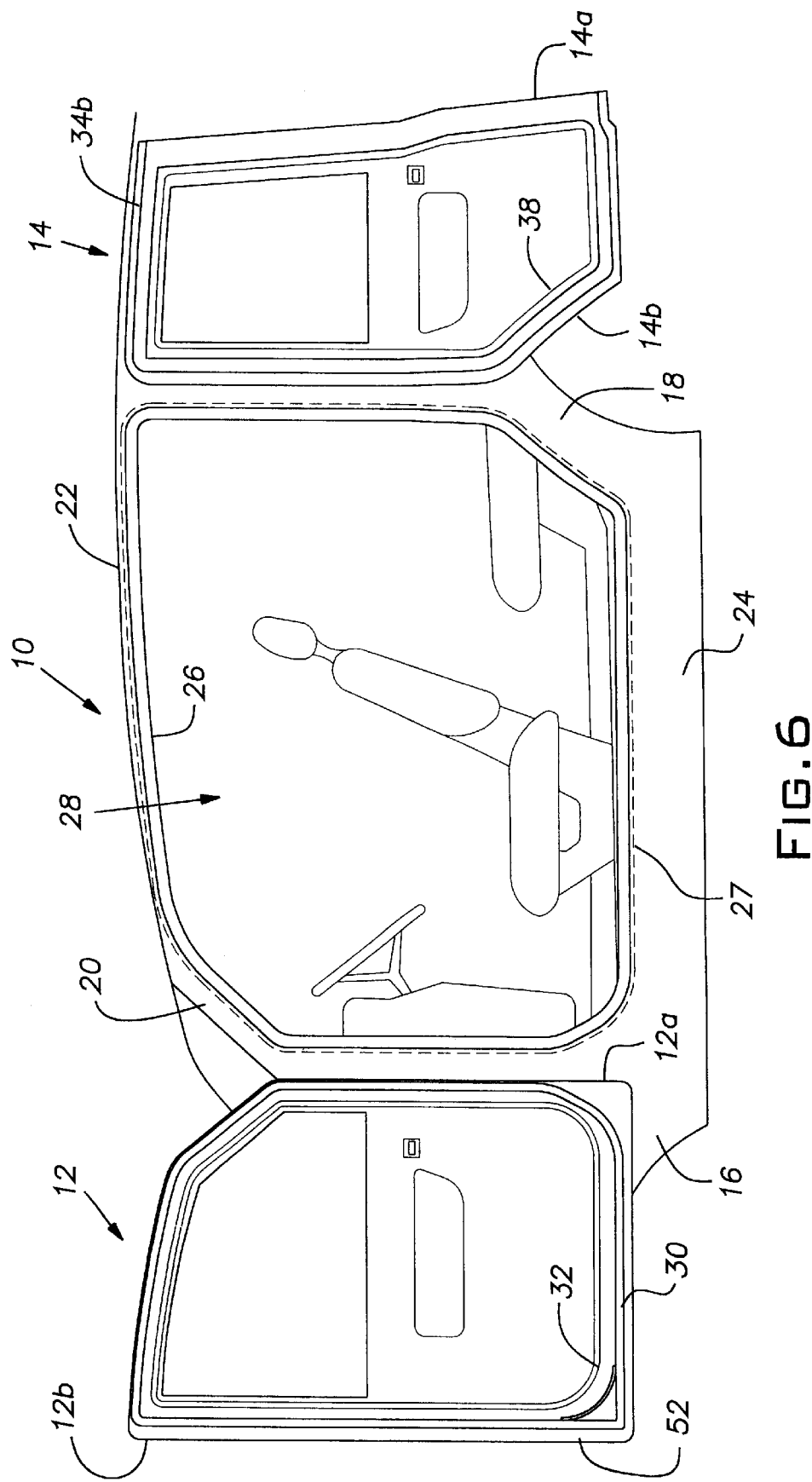

With reference to FIGS. 1 and 6, a vehicle 10 incorporating a seal assembly according to the present invention is shown to include a body having a front door 12 and a rear door 14 secured thereto. The front door 12 is pivotally secured at its forward end 12a to a front panel 16 of the vehicle body, and extends therefrom to a free rearward end 12b. Similarly, the rear door 14 is pivotally secured at its rearward end 14b to a rear body panel 18 and extends therefrom toward a free forward end 14a. The vehicle body includes an A-pillar 20, a roof 22, the front and rear body panels 16, 18, and a rocker panel 24 that cooperate to define a door opening 28. The front and rear doors 12, 14 cooperate to open and close the door opening 28, as illustrated. A conventional, separate B-pillar is not provided. Rather, the B-pillar structure is incorporated into the rear door 14 to provide the desired structural integrity while providing increased access to the vehicle passenger compartment via the enlarged door opening 28.

A first or door opening seal 26 is disposed around the periphery of the door opening 28 and is engaged by sealing surfaces 32, 38 provided by the front and rear doors 12, 14, respectively, as will be described more fully hereinafter. Similarly, the vehicle body provides a second or body opening sealing surface 27 that the front and rear door seals 30, 34b, described hereinafter, engage. The second sealing surface 27 generally surrounds, and is disposed outwardly from, the door opening seal 26.

The front door 12 carries a second or front door seal 30 that faces toward the interior of the vehicle 10 and extends around the front door 12. In this regard it is noted that at some portions of the front door (i.e., rearward and lower ends) the front door seal 30 is spaced from the edge of the front door, while at other portions of the front door (i.e., the top and forward end) the front door seal 30 is disposed at, or very close to, the edge of the front door. An inwardly facing surface of the front door 12 defines a first or front door sealing surface 32 that extends around the front door at a location spaced from a peripheral edge thereof. The front door seal 30 is disposed outwardly of, and relatively surrounds, the first sealing surface 32 provided by the front door 12. An adaptor 50, discussed hereinafter, is provided at the lower rear corner of the front door and places the front door seal 30 in a desired position for engagement with the rear door.

Similarly, the rear door carries a third or rear door seal that may be considered to consist of a first part 34a and a second part 34b. The first part 34a of the rear door seal is generally vertically oriented, extends adjacent the forward end 14a of the rear door 14, and faces away from the interior of the vehicle 10. The first part 34a of the rear door seal is adapted to engage the portion of the first sealing surface 32 extending along the rearward end 12b of the front door 12. The second part 34b of the rear door seal extends around at least a portion of the rear door 14 and faces toward the interior of the vehicle 10. Preferably, the top, rearward, and bottom ends of the rear door 14 have the second part 34b of the rear door seal secured thereto, while the inwardly facing surface of the forward end 14a of the rear door 14, exclusive of the top and bottom ends thereof, does not include the rear door seal as there is no corresponding structure on the vehicle body to seal against.

The rear door 14 provides a third or rear door sealing surface 36 at its forward end 14a. The third sealing surface 36 faces away from the vehicle body, and is disposed rearwardly from, and outwardly of, the first part 34a of the rear door seal, as illustrated. Therefore, when the rear door 14 is closed, the second and third sealing surfaces 27, 36 cooperate to define a generally continuous surface against which the front door seal 30 seats.

The rear door 14 also provides another rear door sealing surface on an inwardly facing surface thereof that is referred to hereinafter as a fourth sealing surface 38. The door opening seal 26 provided around the door opening 28 seats against the fourth sealing surface 38 when the rear door 14 is closed. The fourth sealing surface 38 extends along the top, rear, and bottom ends of the rear door 14. Like the front door seal 30, the second part 34b of the rear door seal is disposed outwardly relative to the door opening seal 26 when the rear door is closed against the vehicle body and essentially surrounds the associated portions of the door opening seal 26. Alternatively, the second part 34b may provide a pair of sealing strips (shown in dashed lines in FIG. 5) along the lower end of the rear door 14 that seat against the rocker panel 24 at relatively spaced apart locations. In this alternative construction, the door opening seal 26 at the lower end of the rear door 14 may be eliminated.

Figure 5:
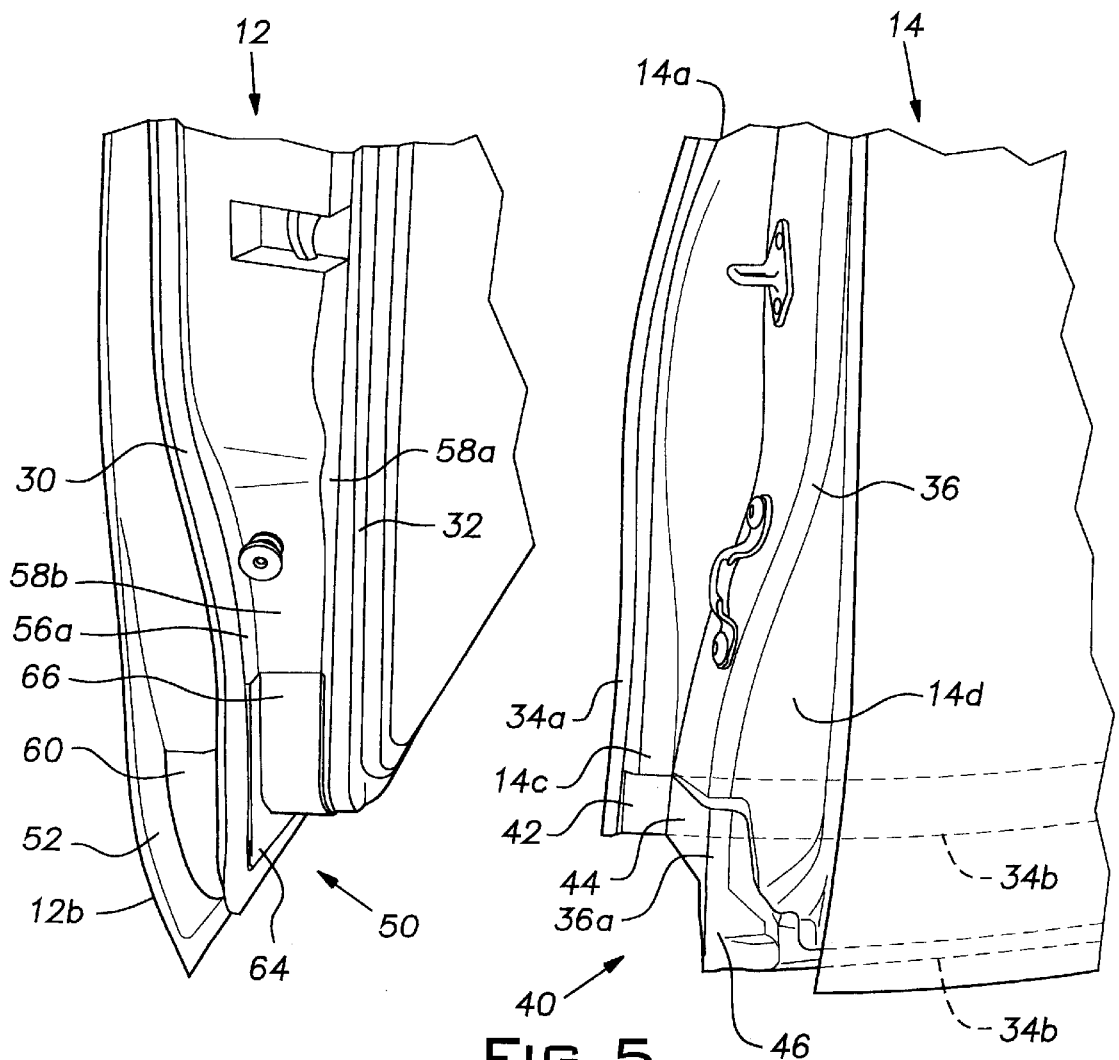
FIG. 5 is a perspective view of a lower portion of the front and rear doors, with the doors in an open position; and, FIG. 6 is a partially exploded perspective view showing a portion of the vehicle body and inner surfaces of the front and rear doors.

With reference to FIG. 5, a sealing boot 40 is disposed over the front bottom corner of the rear door 14. The sealing boot 40 is preferably integrally formed with, or otherwise attached to, the first and second portions 34a, 34b of the rear door seal so as to define a unitary structure. The boot 40 defines a portion 36a of the third sealing surface 36 against which the front door seal 30 seats.

More specifically, the sealing boot 40 includes an inner portion 42 that is slipped over an inner forwardly-extending flange 14c of the rear door 14, an intermediate portion 44 extending across the thickness of the rear door 14, and an outer portion 46 extending over a recessed outer surface 14d of the rear door 14. A portion (not shown) of the boot 40 preferably extends over the lower edge, and across a portion of the lower end, or the rear door 14. The boot outer portion 46 defines a lower extent 36a of the third sealing surface 36 provided by the rear door 14 and is integrally connected to the second portion 34b of the rear door seal extending along the lower end of the rear door 14. The inner portion 42 is integrally connected to the first part 34a of the rear door seal. Thus, the outer portion 46 of the sealing boot 40 is a sealing surface that cooperates to define a seal-on-seal structure when engaged by the front door seal 30, while the inner portion 42 of the sealing boot 40 is engaged by first sealing surface 30 of the front door 12.

An inner surface of the front door 12 has an adaptor in the form of a gusset or corner piece 50 secured thereto. The gusset 50 serves to modify the path traversed by the front door seal 30 to permit the front door 12 to be used on vehicles, such as the illustrated vehicle, that lack a conventional, separate B-pillar. Accordingly, the gusset 50 supports a portion of the front door seal 30 and causes the front door seal portion to project toward the terminal rear, bottom corner of the front door 12, as illustrated. The front door seal portion is thus positioned to engage the inner outer portion 46 of the sealing boot 40, discussed hereinbefore, which defines a portion of the third sealing surface 36 provided by the rear door 14. Moreover, the gusset 50 serves to define a front door seal path having a relatively sharper corner than would otherwise be possible With reference to FIGS. 2–5, the lower rear corner of the front door includes a peripheral flange 52 and a stepped structure defined herein as providing an outer raised ledge 54, an intermediate platform 56, and a raised inner platform 58. Each of the raised outer ledge 54, intermediate platform 56, and raised inner platform 58 includes upper and lower walls 54a, 54b; 56a, 56b; 58a, 58b that, in cross-section, are generally at right angles to one another and to adjacent walls, as illustrated. The lower wall 54b of the outer ledge 54 is generally contiguous with the peripheral flange 52, and extends away therefrom at right angles.

The upper wall 54a of the outer ledge 54 serves as a support for a portion of the front door seal 30, while the upper wall 58a of the raised inner platform 58 defines a portion of the first sealing surface 32. The lower walls 54b, 56b of the outer ledge 54 and intermediate platform 56 have a profile defining a smooth curve as they merge or transform from extending in a generally vertical direction to a generally horizontal direction, as illustrated.

As will be appreciated, when the doors 12, 14 are closed the portion of the flange 52 extending along the rearward end 12b of the front door 12 overlaps and covers the recessed surface 14d of the rear door, while the portion of the flange 52 extending along the lower end of the front door 12 overlaps and covers a portion of the rocker panel 24.

The gusset or corner piece 50 is disposed over the stepped structure, and supported on the upper walls 54a, 56a of the raised outer ledge 54 and intermediate platform 56, so as to extend outwardly and downwardly away from the ledge 54 and intermediate platform 56 toward the lower, rear corner of the front door 12.

More specifically, the gusset 50 includes a lower wall 60, a seal support wall 62, a somewhat triangular-shaped fill wall 64, and an upper wall 66. Preferably, the gusset walls are integrally formed so as to define a unitary structure. As shown in the drawing figures, the gusset lower wall 60 is generally L-shaped, and has opposite ends that merge with and overlie the lower wall 54b of the raised ledge 54. An intermediate portion of the gusset lower wall 60 is spaced from the ledge lower wall 54b and defines a generally 90° corner, as opposed to the smooth curve presented by the ledge lower wall 54b, discussed hereinbefore. A lower edge of the gusset lower wall 60 preferably abuts the peripheral flange 52 of the front door 12, as illustrated. The gusset lower wall 60 has a variable height to accommodate the structural configuration of the host front door 12.

The seal support wall 62 is generally L-shaped in cross section so as to define a first portion 62a and a second portion 62b. The first portion 62a extends away from the lower wall 60 and overlies the ledge upper wall 54a. The second portion 62b extends upwardly from the first portion 62a and over the adjacent intermediate platform lower wall 56b. The seal support wall 62 thus defines an extension of the ledge upper wall 54a around which the front door seal 30 extends relatively away from the ledge upper wall 54a. The seal support wall 62 defines a corner around which the front door seal 30 extends. A seal retaining tab 68 is formed at the seal support wall corner, and serves to compress the front door seal 30 and therefore help retain the seal on the seal support wall 62.

The fill wall 64 extends over a portion of the intermediate platform upper wall 56a, and serves to cover the gap between the intermediate platform's lower wall 56b and the second portion 62b of the seal support wall 62, which is a maximum at the seal support wall corner. The gusset upper wall 66 extends upwardly from the fill wall 64 so as to cover the inner platform lower wall 58b. The gusset upper wall 66 includes a lip 70 at a terminal end thereof that lays over the inner platform upper wall 58a, thereby helping to register the gusset 50 on the stepped structure.

Preferably, the front door seal 30 includes mechanical fasteners, such as barbed posts, that extend through openings formed in the second portion 62b of the seal support wall 62 and openings formed in the intermediate platform lower wall 56a to secure the front door seal 30 to the gusset 50 and the front door 12, respectively. Naturally, aligned openings formed in the gusset 50 and stepped structure, although not illustrated, will be provided to secure the gusset 50 to the front door 12.

The gusset 50 serves to extend the path traversed by the front door seal 30 toward a lower rear corner of the front door 12, and thereby places the associated portion of the front door seal 30 in position to engage the sealing surface 36 provided by the rear door 14. Providing the gusset 50 on the front door 12 thus adapts the front door, which may otherwise be used on a vehicle including a conventional B-pillar, for use on a vehicle lacking such a conventional B-pillar. Accordingly, the gusset 50 permits use of the front door 12 in an application in which sealing the lower rear end of the front door 12 directly to a lower front end of the rear door 14 would otherwise not be possible.

Although the preferred embodiments of the present invention have been described herein with particularity, the present invention is not limited thereto. Rather, it is considered apparent that numerous modifications, substitutions, and additions may be resorted to without departing from the scope and spirit of the present invention. In this regard, it is contemplated that alternative sealing structures may be used herein with equal functionality. For example, instead of having the door opening seal extend completely around the door opening, it is contemplated that the door seal only extend around the front, top and rear of the door opening and that the front and rear doors will provide further seals that will engage accommodating sealing surfaces on the rocker panel. Accordingly, the present invention is not to be limited to that described hereinbefore, but rather is only defined by the claims attached hereto, and equivalents thereof.

What is claimed is:

1. An assembly for sealing a portion of a front door directly to a rear door on a vehicle, said assembly comprising:

an adaptor secured to a lower rear corner of the front door;

a front door seal secured to an inner surface of the front door and having a portion that extends over said adaptor;

a sealing surface provided at a forward end of said rear door and against which said front door seal portion seals.

2. The assembly according to claim 1, wherein said adaptor is a gusset that defines a generally 90° corner around which said front door seal extends.

3. The assembly according to claim 1, wherein said rear door carries a rear door seal, and said rear door seal provides at least a portion of said sealing surface.

4. The assembly according to claim 1, wherein said front door defines a front door sealing surface against which a rear door seal seats when the front and rear doors are closed.

5. The assembly according to claim 1, wherein an inner surface of said front door defines a stepped structure and said adaptor is secured over said stepped structure.

6. The assembly according to claim 5, wherein said stepped structure defines a curved surface and said adaptor defines a corner that is spaced from said curved surface.

7. The assembly according to claim 6, wherein said front door seal extends around said adaptor corner.

8. The assembly according to claim 7, wherein said rear door carries a rear door seal, and said rear door seal provides at least a portion of said sealing surface.

9. The assembly according to claim 8, wherein said front door defines a front door sealing surface against which the rear door seal seats when the front and rear doors are closed.

10. A sealing assembly for sealing a door opening of a vehicle, comprising:
    a front door having a pivotally secured forward end and a free rearward end, said front door having an inner surface to which is secured a front door seal;
    a rear door having a pivotally secured rearward end and a free forward end, said rear door having an inner surface and an outer surface, and having a seal disposed on said outer surface at said forward end of said rear door;
    an adaptor secured to said front door adjacent a lower portion of said front door rearward end, said adaptor carrying a portion of said front door seal;
    means for sealing the front and rear doors to the vehicle around the door opening; and,
    wherein said rear door defines a sealing surface against which said front door seal seats when said front and rear doors are closed.

11. The assembly according to claim 10, wherein said adaptor is a gusset that defines a corner and said front door seal extends around said gusset corner.

12. The assembly according to claim 10, wherein said rear door seal provides at least a portion of said sealing surface.

13. The assembly according to claim 12, wherein said front door defines a front door sealing surface against which the rear door seal seats when the front and rear doors are closed.

14. The assembly according to claim 13, wherein said portion of said rear door sealing surface and said rear door seal are integral with one another.

15. The assembly according to claim 14, wherein said rear door seal includes a boot that is disposed over a lower front corner of said rear door.

16. The assembly according to claim 10, wherein said means for sealing the front and rear doors to the vehicle around the door opening comprises:
    a door opening sealing surface extending at least partially around said door opening;
    the front door seal extends at least partially around said front door; and
    the rear door seal disposed on the outer surface of the rear door is a first portion of the rear door seal, a second portion of the rear door seal being disposed on an inner surface of said rear door and extends at least partially around said rear door, wherein said front door seal and said rear door seal second portion engage said door opening sealing surface when said front and rear doors are closed.

17. The assembly according to claim 16, wherein said rear door sealing surface cooperates with said door opening sealing surface to define a substantially continuous surface against which said front door seal seats when said front and rear doors are closed.

18. The assembly according to claim 17, wherein said adaptor is a gusset that defines a corner and said front door seal extends around said gusset corner.

19. The assembly according to claim 18, wherein said rear door seal provides at least a portion of said rear door sealing surface.

20. The assembly according to claim 19, wherein said front door defines a front door sealing surface against which the rear door seal seats when the front and rear doors are closed.

21. The assembly according to claim 19, wherein said portion of said rear door sealing surface and said rear door seal are integral with one another.

22. The assembly according to claim 21, wherein said rear door seal includes a boot that is disposed over a lower front corner of said rear door.

23. A vehicle assembly, comprising:
    a vehicle body having a door opening and providing a door opening sealing surface that extends at least partially around said door opening;
    a front door having a pivotally secured forward end and a free rearward end, said front door having an inner surface to which is secured a front door seal;
    a rear door having a pivotally secured rearward end and a free forward end, said rear door having an inner surface to which is secured a rear door seal, said front and rear door seals being adapted to seat against said door opening sealing surface when said front and rear doors are closed;
    an adaptor secured to the front door adjacent a lower corner of the front door, said adaptor receiving a portion of the front door seal and directing said front door seal toward the lower rear corner of the front door;
    wherein an outwardly facing surface of the forward end of the rear door defines a rear door sealing surface against which said front door seal portion seats when said front and rear doors are closed.

24. The assembly according to claim 23, wherein said rear door sealing surface cooperates with said door opening sealing surface to define a substantially continuous surface against which said front door seal seats when said front and rear doors are closed.

25. The assembly according to claim 24, wherein said adaptor is a gusset that defines a corner and said front door seal extends around said gusset corner.

26. The assembly according to claim 25, wherein said rear door seal provides at least a portion of said rear door sealing surface.

27. The assembly according to claim 26, wherein said front door defines a front door sealing surface against which the rear door seal seats when the front and rear doors are closed.

28. The assembly according to claim 26, wherein said portion of said rear door sealing surface and said rear door seal are integral with one another.

29. The assembly according to claim 28, wherein said rear door seal includes a boot that is disposed over a lower front corner of said rear door.

30. An adaptor for a front door to permit the front door to be used on a vehicle lacking a conventional B-pillar structure, comprising:
    a gusset, said gusset being adapted to be secured adjacent to a lower rear corner of the front door, said gusset receiving a portion of a front door seal and directing said front door seal toward the lower rear corner of the front door.

* * * * *